United States Patent [19]

Hill

[11] Patent Number: 4,758,721
[45] Date of Patent: Jul. 19, 1988

[54] THERMAL CYCLE RECIRCULATING PUMP FOR ISOTOPE PURIFIER

[75] Inventor: David A. Hill, Culver City, Calif.

[73] Assignee: Isotope Purifiers Ltd., Palo Verdes Estates, Calif.

[21] Appl. No.: 946,827

[22] Filed: Dec. 29, 1986

[51] Int. Cl.⁴ .............................................. H01J 49/00
[52] U.S. Cl. .................................. 250/283; 250/288; 250/281
[58] Field of Search .................... 250/283, 423 P, 288, 250/281, 282

[56] References Cited

U.S. PATENT DOCUMENTS 2,533,966 12/1950 Simmons, Jr. ..................... 250/284
3,758,777 9/1973 Brunnee et al. ..................... 250/288

OTHER PUBLICATIONS

Nuclear Instruments and Methods, Meunier et al, Progress Report on Separators Sidonie and Paris, V. 139, 1976, pp. 101-104.

*Primary Examiner*—Carolyn E. Fields
*Assistant Examiner*—John A. Miller
*Attorney, Agent, or Firm*—Roberts & Floyd

[57] ABSTRACT

A magnetic mass spectrometer used to purify ions in a polyisotopic mixture wherein non-ionized particles which exit the ion source are collected in the vacuum chamber and are then introduced into a thermal cycle pump and returned to the ion source to increase the yield. This purifier will both separate a desired isotope, such as iodine-123, from the polyisotopic mixture produced by a conventional small cyclotron, and increase the recovery rate, thus making feasible its use in nuclear medicine.

4 Claims, 4 Drawing Sheets

THERMAL CYCLE RECIRCULATING PUMP FOR ISOTOPE PURIFIER

This invention is disclosed in part in my co-pending application entitled PRESELECTOR SOURCE FOR ISOTOPE SEPARATION, filed on even date with the present application.

SUMMARY OF THE INVENTION

This invention will separate and enrich a single isotope such as iodine-123, to very high purity, from a polyisotopic mixture produced by a conventional small cyclotron. This invention will also greatly increase the recovery rate of the selected isotope, thus lowering the cost of pure isotopes, and making feasible their use in nuclear medicine.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BACKGROUND OF THE INVENTION

Many elements have chemically identical isotopes, which vary only in the number of their neutrons. These isotopes of a single element are often co-produced in a single reaction. The isotopes of a single element do vary, particularly in their radioactivity, and therefore purification or separation of the isotopes leads to an improved product. However, these isotopes, being chemically identical, are difficult to separate.

By way of example, iodine-123 is a close-to-ideal radioactive isotope used in nuclear medicine. It permits diagnostic tomography of a patient's brain to allow a physician to distinguish between multiple infarct dementia, associated with a series of strokes, and Alzheimer's Disease. These two diseases, requiring quite different treatment have, prior to diagnostic tomography, given only obscure and conflicting symptoms.

Pure iodine-123 is close-to-ideal because it has a 13 hour half life allowing shipment nationwide and yet decaying sufficiently rapidly so that the patient does not receive an excessive dosage of radiation. Pure iodine-123 emits a single characteristic energy, 159 keV, and practically no other radiation. Pure iodine-123 is well tolerated by the human organism and is readily compounded as a label into many biochemical agents without disrupting their action.

The principal drawback to the use of pure iodine-123 in nuclear medicine is that pure iodine-123 is expensive to produce. Most of the iodine-123 which is available is not pure. It is produced by a 20 to 40 MeV cyclotron or linear accelerator. The high energy protons from the cyclotron bombard a target enriched in tellurium-124, whose atomic number is 52 compared with iodine whose atomic number is 53. The high energy proton principally dislodges two neutrons to produce iodine-123 in the reaction:

Te-124 (p,2n)→I-123

Some of the bombarding protons dislodge only one neutron. In addition, the target contains residual amounts of tellurium-125 and tellurium-126. The result is that about 3% of iodine-124 and iodine-125 is co-produced in the side reactions:

Te-124 (p,n)→I-124

Te-125 (p,n)→I-125

Te-126 (p,2n)→I-125

These two isotopes of iodine, even a few percent, are each unwanted in nuclear medicine for different reasons. Iodine-124 emits other radiation which degrades the output of diagnostic tomography, making it a less precise test. The radiation from iodine-125 is soft, i.e., X-rays which are absorbed within the patient, and therefore does not degrade the output of diagnostic tomography. However, iodine-125 has a half life of 60 days, thus substantially increasing the internal radiation dosage to the patient.

Two alternative processes exist to produce pure iodine-123. The first one uses a 20-40 MeV cyclotron in which the high energy proton bombards a target of xenon-124 and dislodges two neutrons to produce cesium-123. This then decays in 8 minutes to xenon-123, which decays in 2 hours to iodine-123, according to the reaction:

Xe124 (p,2n)→Cs-123 (8 min)→Xe 123 (2 hrs)→I-123

This reaction produces high purity iodine-123, but does so very expensively because xenon-124 is a very rare isotope. The process was, until recently, therefore limited to research applications.

The second process uses a 70 MeV cyclotron with an iodine 127 target. The high energy proton can dislodge 5 neutrons to produce xenon-123, which decays in 2 hours to a solid iodine-123 according to the reaction:

I-127 (p,5n)→Xe-123 (2 hr)→I-123

In a first side reaction the proton dislodges 4 neutrons to produce a gaseous xenon-124, according to the reaction:

I-127 (p,4n)→Xe-124 (stable)

which is a stable gas, and further separates from the solid iodine-123.

Another side reaction occurs. In this, the proton dislodges three neutrons to produce xenon-125, which decays to iodine-125, according to the reaction:

I-127 (p,3n)→Xe-125→I-125

About 0.2% of iodine-125 is co-produced and is a contaminant.

To date, all 70 MeV cyclotrons have been built for research, not commercial applications, due to the expense of building and operating them. One 70 MeV cyclotron should become operational in the United States in 1986, which will be the first one dedicated to the commercial production of radioactive isotopes for nuclear medicine.

This low recovery rate is acceptable in an analytical or research magnetic mass spectrometer. This technology becomes uneconomic, however, for commercial applications, including separating radioactive isotopes for nuclear medicine.

A technology to purify or separate a polyisotopic mixture has existed since the 1920's. This is the magnetic mass spectrometer or mass analyzer, which achieves a physical separation according to mass by differentially deflecting ionized isotopes of different atomic weight, the lighter isotopes being deflected more than the heavier isotopes.

The first step in a magnetic mass spectrometer is to ionize the isotopes in an ion source. At most only a small portion of the isotopes can be ionized and the remainder of the isotopes escape into the vacuum chamber with no charge and are therefore neither accelerated by the electrode nor deflected by the magnet. Recoveries of 1% to 15% of the desired isotope are typical.

These elements of the present invention appear in innumerable prior art publications, and applicant will not attempt to separately identify what may be the closest prior art.

The applicant has found only two items in the prior art pertinent to the present invention:

Simmons, U.S. Pat. No. 2,533,966, issued Dec. 12, 1950, discloses a novel method to accelerate ions, a moving magnetic field. Simmons also discloses an ion source 17, having two feed pipes for ions, 13 and 14, and two exit pipes 19 and 22. Pipe or casing 22 contains a focusing field 45 for the ionized isotopes to exit into the magnetic field of force 48 of a mass spectrometer. At the other end of the ion source is a grid 20 which repels the ionized isotopes but allows the un-ionized isotopes to enter pipe or conduit 19. These isotopes, supplemented by the feed stock, are recirculated to the ion source through pipes 13 and 14. There is no means to prevent un-ionized isotopes from escaping at the larger opening 21 nor any recirculation of any un-ionized isotopes which escape the ion source 17 at opening 21.

There are crucial differences between the Simmons disclosure and the present invention. First, the present invention recirculates the uncharged isotopes which have left the ionizer chamber with the charged ions, while Simmons withdraws uncharged isotopes from the ionizer and merely recirculates them to the ionizer with no apparent means for increasing the recovery rate thereby. Secondly, the present invention recirculates by first adsorbing and then desorbing the iodine isotope on a glass surface. Simmons recirculates the isotope in the same gaseous state in which it left the ionizer.

Meunier, et al., Nuclear Instruments and Methods 139 (1976) 101-104 discloses a "closed loop circuit" used on two research machines for isotope separation near Paris, France. The machine has a conventional ion source, aperture, vacuum chamber and magnetic mass spectrometer.

Spaced along the vacuum chamber are a series of side chambers, each containing a vacuum pump for the un-ionized isotopes. There is a cascade series of pumps, including oil diffusion pumps, which raise the pressure from $10^{-5}$ Torr to atmospheric pressure. The recovered isotopes are mixed with feed stock and reintroduced to the ion source. The overall recovery rate ranges from 11 to 32%, perhaps a four-fold improvement over conventional, non-recovery isotope separators. This system is limited to inert gases which will not bond to the metal pump parts.

The present invention is an internal recycle under high vacuum, while Meunier is an external recycle utilizing several cascaded pumps to raise the isotope to atmospheric pressure, then reintroduce it to the ionizer under vacuum. The present invention has a recycle loop which is clean, non-reactive, and therefore suitable for iodine. It is non-contaminating, simple, compact and relatively cheap with a recovery rate which may approach 100%. Meunier's recycle loop introduces impurities, is suitable only for inert gases, is complicated, bulky, and expensive. The best utilization reported is 32%.

BRIEF DESCRIPTION OF THE DRAWINGS

The invention will be better understood and the objects other than those set forth above will become apparent when consideration is given to the following detailed description thereof. Such description makes reference to the annexed drawings wherein.

DESCRIPTION OF THE PREFERRED EMBODIMENTS

Overview

Figure 1:
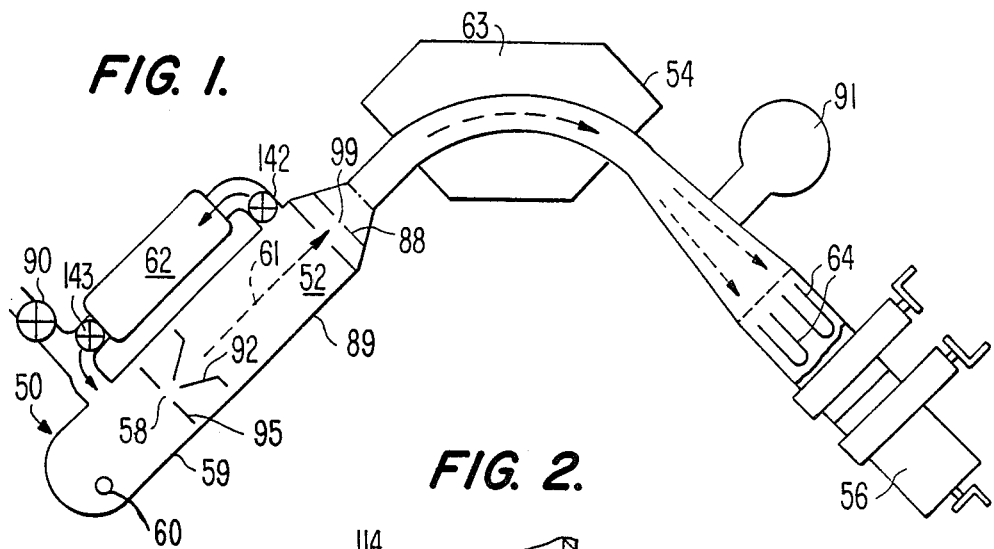
FIG. 1 is a schematic view of the elements of the invention.

This invention is disclosed broadly in FIG. 1, which shows the elements in a schematic or diagrammatic drawing. Not shown is the prior art cyclotron, for instance 20-40 MeV, which may produce the feed material as a polyisotopic mixture.

The feed material is introduced, through an air lock 90, to the discharge region 59 of the ion source 50. The pressure here is about $10^{-3}$ Torr. Here ionized isotopes are generated by means to bombard the polyisotopic mixture, such as an electrodeless RF discharge 60. Both ionized isotopes and uncharged isotopes leave the discharge region 59 through an aperture 58 of about 1 mm. diameter in the wall 95 of the discharge region 59.

The singly charged and doubly charged isotopes are accelerated as they leave the aperture 58 under the influence of extraction electrode 92. They form a collimated ion beam 61 which passes through a second aperture 99 in a second wall 88. This portion of the apparatus is maintained at $10^{-5}$ Torr by a vacuum pump 91.

The apparatus described above is essentially a prior art ion source 50 for an analyzer such as a magnetic mass analyzer 54, or an electrostatic deflection analyzer or a RF quadrupole analyzer. It will ionize only about 5% to 20% of the isotopes, so the great majority of the particles leaving the prior art ion source 50 are uncharged isotopes.

In the conventional magnetic mass analyzer 54, the uncharged atoms will strike the walls 89 because they are not accelerated and collimated by the extraction electrode 92. The walls of the vacuum chamber in a conventional analyzer are at a temperature which will adsorb, condense or react with and bind any atom of the feed material which strikes them. This invention includes maintaining the walls 89 of the vacuum chamber 52 at an elevated temperature, namely above the temperature at which the gaseous isotope will adsorb or condense. This temperature is 600° C.

This invention also includes a thermal cycle recirculating pump 62 which is connected to the vacuum chamber 52 through an intake valve 142. The thermal cycle recirculating pump 62 is also connected through an exhaust valve 143 to the discharge region 59. One or more surfaces of the thermal cycle recirculating pump 62 are alternately heated and then cooled.

During the first phase the intake valve 142 is open and the exhaust valve 143 is closed. One surface of the thermal cycle recirculating pump 62 is cooled to 200° C. The uncharged isotopes will bounce off the walls 89 of the vacuum chamber 52. At some point they will randomly enter the thermal cycle recirculating pump 62 where they will adsorb or condense on the cooled surface.

Adsorption and condensation both refer to the devaporization of a gaseous substance. Adsorption refers to the substance, such as iodine, combining with another substance, such as the glass wall. Condensation means the liquification of iodine by iodine. Depending on the conditions, either or both processes may occur. These processes are therefore collectively called devaporizing and attaching of the gaseous iodine to the wall of the pump.

During the second phase, the intake valve 142 is closed and the exhaust valve 143 is opened. The thermal cycle recirculating pump 62 is raised to an elevated temperature sufficient to desorb or vaporize the uncharged isotopes and drive them back again into the discharge region 59.

When the discharge region 59 achieves a 20% ionization rate then each atom will, on the average, recirculate from the discharge region 59 through the thermal cycle recirculating pump 62 four times before exiting the ion source 50 as a ionized isotope. This means that the discharge region 59 will draw only 20% of new feed material from the cyclotron and the remainder 80% of recycled ionized isotopes from the thermal cycle recirculating pump 62.

The remainder of the elements shown in FIG. 1 are a conventional prior art magnetic mass analyzer 54. This includes a conventional, 90° deflection, double focusing m bends the collimated ion beam 61 differentially based on the isotopic weight and the charge. The few doubly charged isotopes will strike the inner wall of the vacuum chamber 52 in the vicinity of the magnet 63 and be recovered by the thermal cycle recirculating pump 62.

The singly charged isotopes will be directed to two or more collectors 64 where they condense. One of the collectors 64 is reserved for the ionized isotope iodine-123. The collectors 64 are withdrawn through a vacuum lock 56.

This apparatus will thus separate the radioactive isotope iodine-123 at a very high purity and at a very high recovery rate.

Single Chamber Pump

Figure 2:
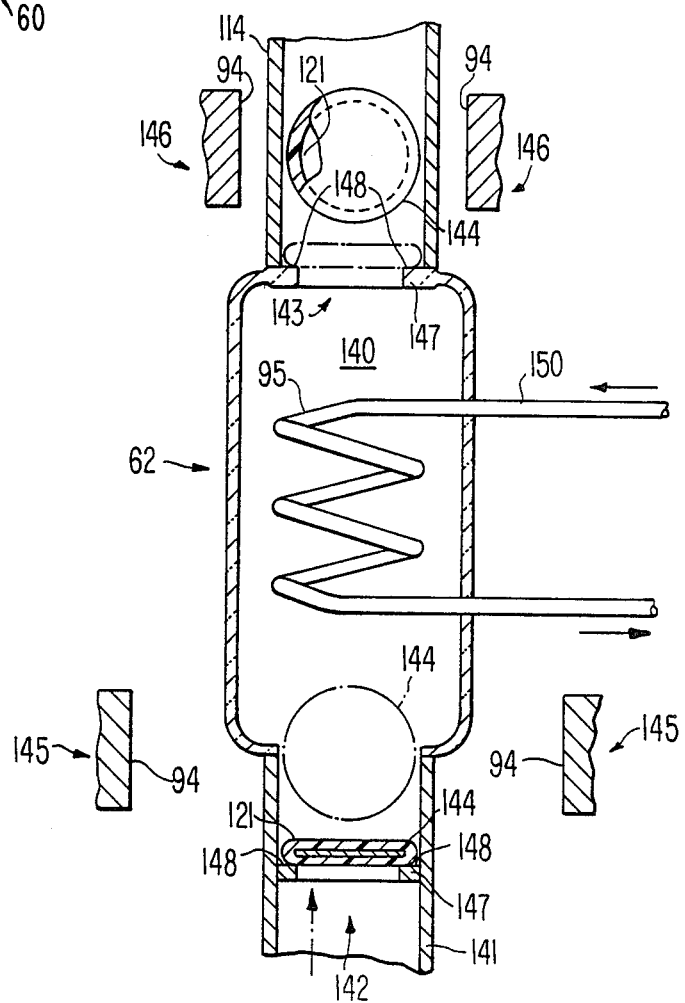
FIG. 2 is a cross-sectional view of first embodiment of this invention.

A first embodiment of the invention is disclosed in FIG. 2, which shows the thermal cycle recirculating pump 62 portion shown in FIG. 1.

The thermal cycle recirculating pump 62 is mounted vertically above the vacuum chamber 52. It comprises an intake pipe 141, a cylindrical chamber 140, and a return pipe 114. Between the intake pipe 141 and the cylindrical chamber 140 is a intake valve 142. Between the cylindrical chamber 140 and the return pipe 114 is an exhaust valve 143.

Each valve has a valve disc 144 containing an iron armature 121. The valve discs 144 are selectively raised by the first magnet 145 and second magnet 146. When the magnet is removed or de-energized, the valve discs 144 fall by gravity onto the two circular shoulders 147, which each form a valve seat 148.

Both the first magnet 145 and the second magnet 146 have a pair of pole tips 94 that are elongated in the vertical direction. When either first magnet 145 or second magnet 146 is energized the corresponding valve disc 144 rises off the valve seat 148 and rotates into the vertical plane, thus opening the valve.

The thermal cycle recirculating pump 62 has a heat transfer coil 150 through which gases are cyclically pumped at 600° C. and 200° C. thus heating or cooling the walls 95 of the heat transfer coil 150.

In the first phase, the first magnet 145 is energized opening the intake valve 142. Cooling gas is pumped through the heat transfer coil 150. The randomly moving uncharged isotopes in the vacuum chamber 52 enter the thermal cycle recirculating pump 62 and are adsorbed or condensed on the surface of the heat transfer coil 150.

In the second phase the first magnet 145 is de-energized, closing the intake valve 142. The second magnet 146 is energized opening the exhaust valve 143. Hot gases are pumped through the heat transfer coil 150. This desorbs or vaporizes the uncharged isotopes and sends them through the return pipe 114 to the discharge region 59.

Dual Chamber Pumping

Figure 3:
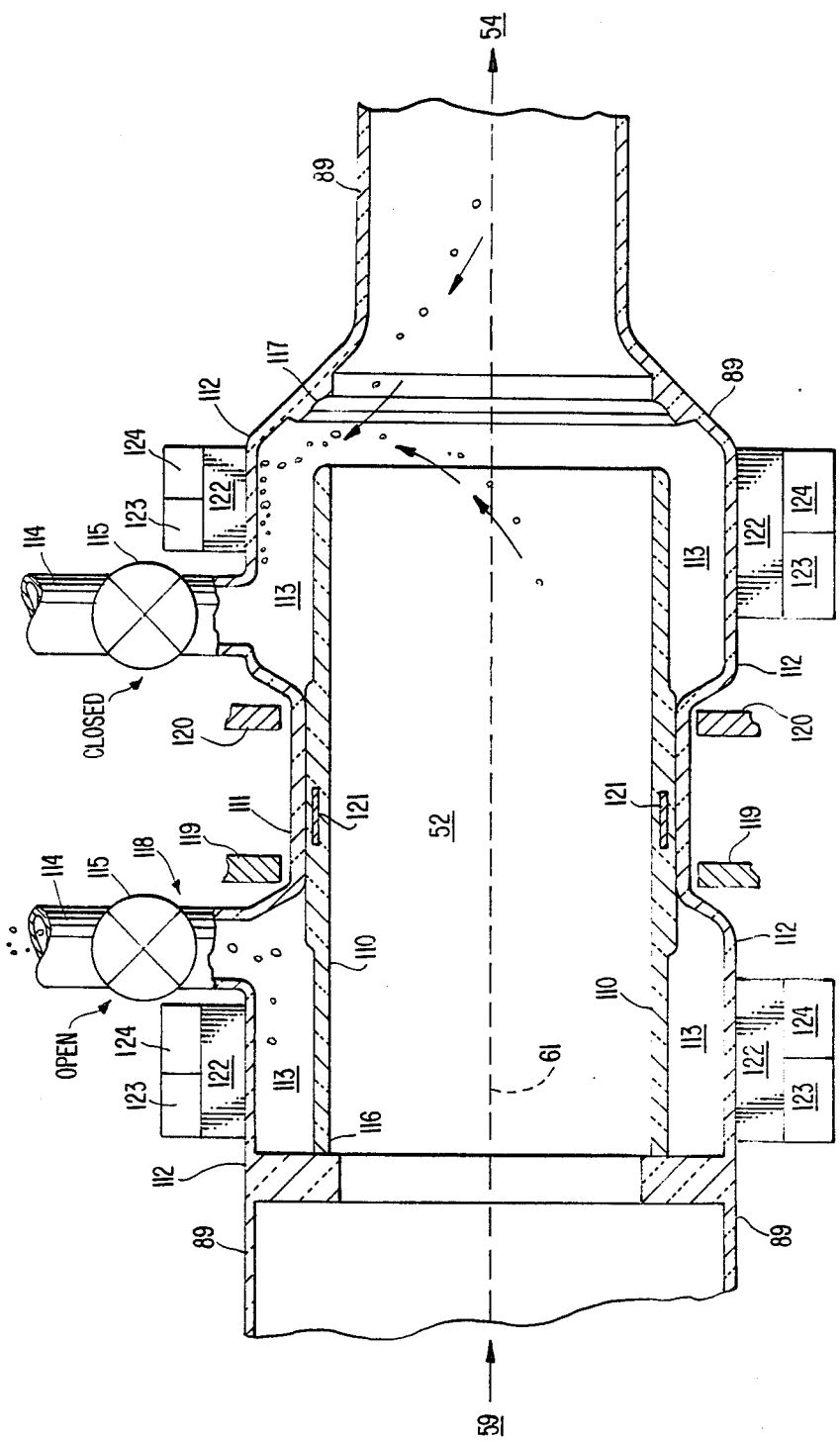
FIG. 3 is a cross-sectional view of a second embodiment of this invention during the first phase of its operating cycle.
Figure 4:
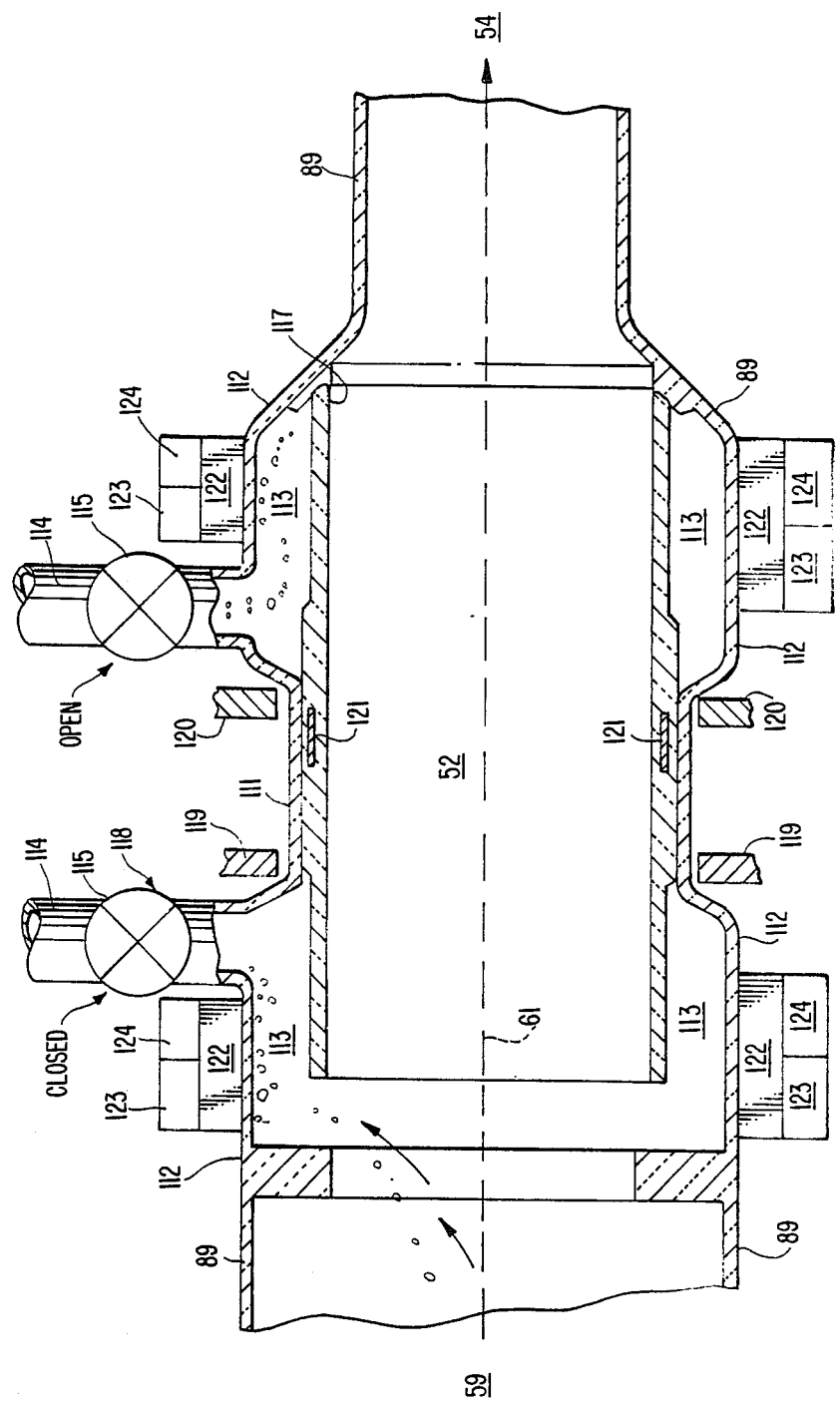
FIG. 4 is same cross-sectional view as FIG. 3 during the second phase.

FIGS. 3 and 4 disclose a second embodiment of the thermal cycle recirculating pump 62 portion shown in FIG. 1. FIG. 3 shows a portion of the vacuum chamber 52 between the discharge region 59 and the magnet 63 of the magnetic mass analyzer 54. Along the axis of the vacuum chamber 52 is the collimated ion beam 61 which has been accelerated by the extraction electrode 92. This collimated ion beam 61 proceeds through the second aperture 99 to the magnet 63 of the magnetic mass analyzer 54 as shown in FIG. 1.

The outer wall 89 of the vacuum chamber 52 forms a symmetrical cylinder around the central axis of the vacuum chamber 52. The outer wall, as shown in section in FIG. 3, has as central section 111 of reduced diameter and two outer sections 112 of increased diameter.

Within the vacuum chamber 52 is cylindrical sleeve 110 which is in sliding and sealing engagement with the central section 111 of the outer wall 89. Embedded within the cylindrical sleeve 110 is a iron armature 121. The cylindrical sleeve 110 forms the inner wall of, alternatively, two annular chambers 113, the outer walls of which are the outer sections 112 of the outer wall 89. The walls of the vacuum chamber 52, the cylindrical sleeve 110 and the return pipe 114 are all made of high purity fused quartz.

Extending radially from each outer section 112 is a return pipe 114 containing an exhaust valve 115. Each exhaust valve 115 is selectively operated as described below. The two return pipes 114 join beyond the two exhaust valves 115 to form a single return pipe 114 connected to the discharge region 59.

On the left is shown a cylindrical square valve seat 116 which both forms a wall of the annular chamber 113 and cooperates with the square end of the cylindrical sleeve 110 to seal off the first pumping chamber 118 forming an intake valve. On the right is the outer section 112 of the outer wall which is beveled. Inside it is a small cylindrical beveled valve seat 117 which cooperates with the beveled end of the cylindrical sleeve 110 to seal off the second pumping chamber.

Outside and surrounding the central section 111 are a first cylindrical magnet 119 and a second cylindrical magnet 120. Inside the cylindrical sleeve 110 and completely encased in high purity fused quartz is an iron armature 121, which cooperates with the cylindrical magnets 119, 120. These are spaced apart the distance of the travel of the cylindrical sleeve 110.

Surrounding the two annular chambers 113 are two series of axially aligned heat transfer fins 122. The heating means 123 directs air at 600° C. and, alternately, the cooling means 124 directs air at 200° C. onto the fins 122.

The thermal cycle recirculating pump 62 operates in two phases, the first of which is shown in FIG. 3. The cylindrical sleeve 110 is pressed against the cylindrical square valve seat 116 forming a pumping chamber 118 in the left annular chamber 113. The left exhaust valve 115 is open and the left outer section 112 has hot air applied by the heating means 123. The uncharged isotopes inside the annular chamber 113 are desorbed or vaporized and returned through the return pipe 114 to the discharge region 59.

There is an opening in the right annular chamber 113 which permits the randomly moving uncharged isotopes to enter that annular chamber 113. The exhaust valve 115 for the right annular chamber 113 is closed. The outer section 112 of the right annular chamber 113 is maintained at 200° C. by cooling means 124. The uncharged isotopes are therefore devaporized as they strike the cooled outer section 112 of the right annular chamber 113.

As shown in FIG. 4, after the first phase, the following changes occur for the second phase. The first cylindrical magnet 119 is deenergized and the second cylindrical magnet 120 is energized forcing the cylindrical sleeve 110 to the right. The left exhaust valve 115 is closed and the right exhaust valve 115 is opened. The cooling means 124 is connected to the left heat transfer fins 122 and the heating means 123 is connected to the right heat transfer fins 122.

The thermal cycle recirculating pump 62 continues operating, with the left annular chamber 113 devaporizing the randomly moving uncharged isotopes from the vacuum chamber 52. The right annular chamber 113 empties its contents by desorbing or vaporizing the condensed uncharged isotopes and returning them to the discharge region 59 through the return pipe 114.

FIGS. 3 and 4 disclose an embodiment of this invention useful with a condensible carrier gas such as bromine, chlorine, or fluorine. The uncharged isotope of the carrier gas will enter the thermal cycle recirculating pump 62 and be adsorbed and desorbed along with the uncharged isotope of iodine or other selected isotope.

Carrier Gas System

Figure 5:
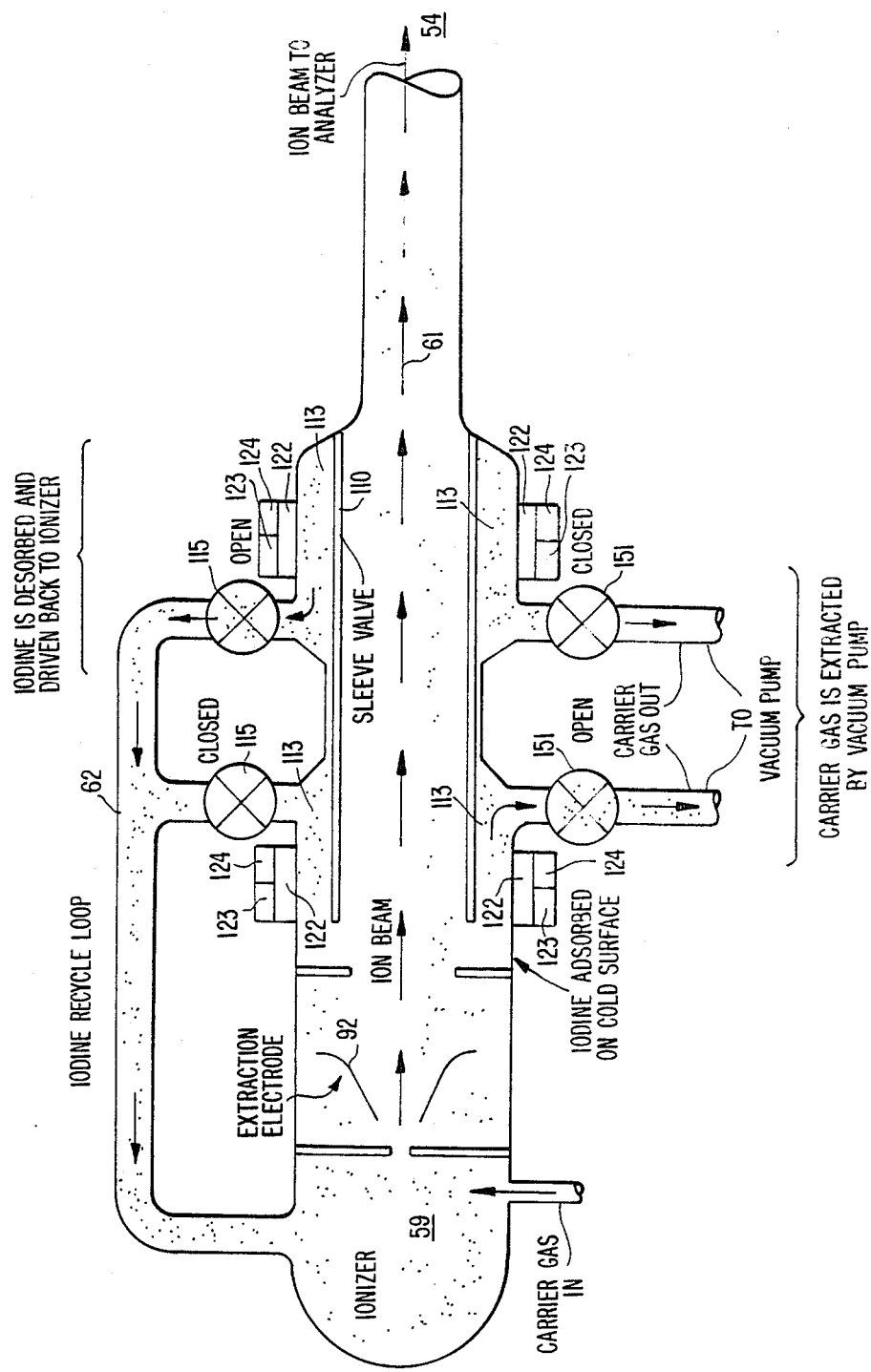
FIG. 5 is a cross-sectional view of a third embodiment of this invention.

A third embodiment of the invention is disclosed in FIG. 5. This shows a thermal cycle recirculating pump 62 suitable for a non-condensible carrier gas such as xenon. The thermal cycle recirculating pump 62 of FIG. 5 is similar to the thermal cycle recirculating pump 62 of FIGS. 3 and 4, except that each annular chamber 113 has a second carrier gas exhaust valve 151 in addition to the exhaust valve 115 for iodine.

The temperature of the cooling means, e.g. 200° C., is chosen so that the walls of the annular chambers 113 will not adsorb the non-condensible carrier gas xenon, but will adsorb the uncharged isotope of iodine. Therefore, the carrier gas alone will pass out of the open carrier gas exhaust valve.

When the cylindrical sleeve 110 seals an annular chamber 113, as it has the right annular chamber 113 in FIG. 5, then the exhaust valve 115 for iodine is opened and the carrier gas exhaust valve is closed. The uncharged isotopes of iodine are desorbed by heating means 123 thereby recycling these isotopes.

Other Embodiments

A turbine capable of operating at 600° C. could serve as the recirculating pump for the uncharged isotopes. If the turbine wheels are made of glass or quartz, the iodine will not stick. There are at present turbo vacuum pumps designed to operate at these pressures. They have aluminum rotors, which would have to be modified.

Alternatively, a diffusion pump could serve as the recirculating pump. Diffusion pumps with glass, instead of metal, walls are known. The use of an oil diffusion pump would require a means to separate reactive isotopes such as iodine from the oil.

The walls of the vacuum chamber, and other parts, may be of Teflon coated metal rather than quartz. The Teflon coating would prevent the uncharged isotopes from adhering. This system would not require operation at elevated temperatures.

It will thus be seen that the objects set forth above, among those made apparent from the preceding description, are efficiently attained and, since certain changes may be made in carrying out the above method and in the article construction of the machine set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A system for the separation and purification of a selected isotope from a polyisotopic mixture which comprises in combination:
   (a) am ion source having a discharge region containing means to bombard the polyisotopic mixture to produce a mixture of ionized and uncharged isotopes;
   (b) a first aperture from said discharge region positioned to allow the ionized and uncharged isotopes to enter a vacuum chamber;
   (c) said vacuum chamber having a plurality of walls maintained at an elevated temperature such that said uncharged isotopes are prevented from devaporizing;
   (d) a thermal cycle recirculating pump connecting said vacuum chamber and said discharge region and having a selectively operable intake valve and a selectively operable exhaust valve and selectively operable heating means and selective operable cooling means;

(e) said intake valve being open and said exhaust valve being closed during a first intake phase and being reversed during a second exhaust phase;

(f) said cooling means operable during said first phase and said heating means operable during said second phase;

(g) said thermal cycle recirculating pump having said uncharged isotopes devaporize and attach on the interior wall of the thermal cycle recirculating pump during the first phase;

(h) said thermal cycle recirculating pump having said uncharged isotopes revaporize and return to the discharge region during the second phase;

(i) an extraction electrode means adjacent said first aperture to accelerate and direct said ionized isotopes toward a second aperture as a collimated ion beam;

(j) an analyzer to receive the collimated ion beam of ionized isotopes and having a means to separate the selected ionized isotope from the other ionized isotopes in the polyisotopic mixture; and, (k) a plurality of collectors to receive the isotopes, one of said collectors positioned to receive said selected isotope and the other collectors positioned to receive the other isotopes;

wherein the selected isotope is separated and purified at a high recovery rate of the selected isotope from the polyisotopic mixture.

2. The isotope separation and purification system of claim 1 wherein:
(a) a condensable carrier gas is introduced into the discharge region; and,
(b) means for allowing the carrier gas to pass into the thermal cycle recirculating pump when the exhaust valve is closed and the intake valve is open.

3. The isotope separation and purification system of claim 1 wherein:
(a) pairs of thermal cycle recirculating pumps are disposed along the vacuum chamber;
(b) each thermal cycle recirculating pump being disposed radially of said vacuum chamber;
(c) each pair of the thermal cycle recycling pumps having its intake valve formed by a common sliding sleeve and a cooperating pair of valve seats; and,
(d) each thermal cycle recirculating pump having at least one selectively operable exhaust valve, a selectively operable heating means, and a selectively operable cooling means.

4. The isotope separation and purification system of claim 3 wherein:
(a) a noncondensible carrier gas is introduced into the discharge region; and,
(b) a second exhaust valve for each thermal cycle recirculating pump is positioned to allow the carrier gas to pass through the annular chamber when a first exhaust valve is closed and the sleeve valve is separated from its associated valve seat.

* * * * *